Aug. 10, 1948. L. H. BROWNE 2,446,571
CHECK VALVE
Filed March 2, 1944
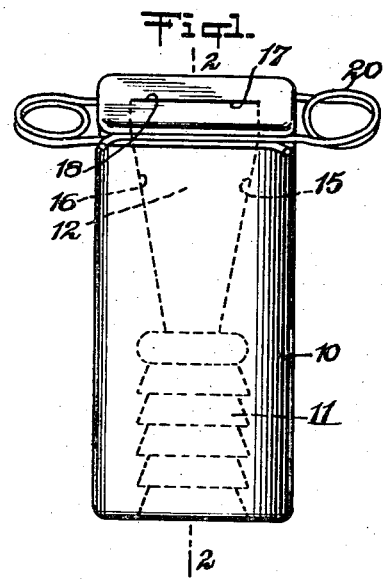
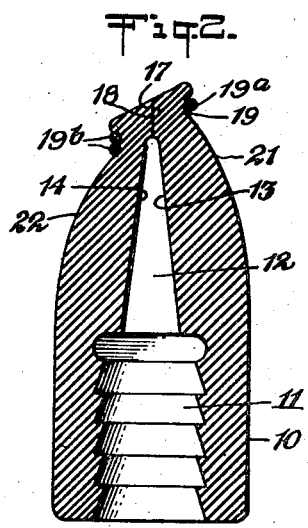
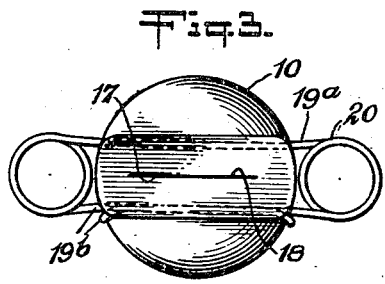
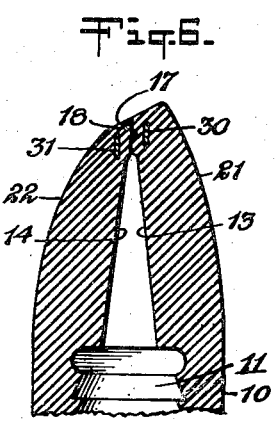
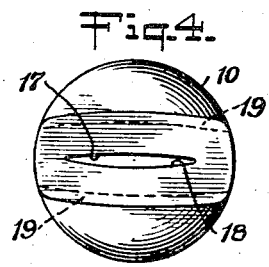
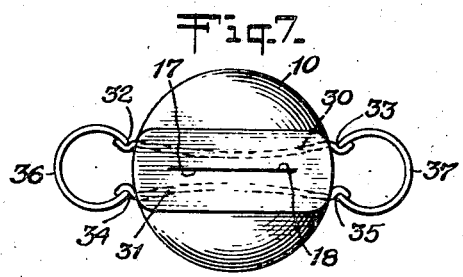
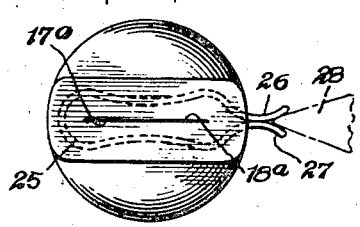
INVENTOR
LINDSAY H BROWNE
BY
ATTORNEYS Patented Aug. 10, 1948

2,446,571

UNITED STATES PATENT OFFICE 2,446,571

CHECK VALVE

Lindsay H. Browne, Westport, Conn., assignor to American Brake Shoe Company, a corporation of Delaware Application March 2, 1944, Serial No. 524,687

3 Claims. (Cl. 251—122)

1

This invention relates to improvements in check valves and has for an object the provision of a molded check valve formed of rubber or the like, and including means for maintaining said valves in closed positions. This invention is a continuation-in-part of application, Serial Number 517,162, filed January 6, 1944, which issued as Patent No. 2,417,968 on March 25, 1947. In said application, the check valves were molded of rubber or other resilient material with a solid dam or barrier adjacent to one end thereof, and subsequently said dam or barrier was slit to form the lips of the valve. Due to the fact that strains existed in the dam or barrier, said strains were ever present to maintain the lips of the valve in a closed position.

According to the present invention, the valve bodies are molded and the lips of the valve are formed at the same time. Maintaining the lips in the closed position is effected by spring means, either molded in or applied to the valve body adjacent to said lips.

Another object of the invention is the provision of a check valve formed of rubber or the like and including a pair of lips constituting the valving end of the valve, and spring means externally applied to said lips for urging them into a closed position.

A further object of the invention is the provision in a check valve, formed of rubber or the like, of a pair of lips forming the valving end of said valve and having spring means molded therein for urging said lips together.

Yet another object of the invention is the provision of a check valve formed of rubber or the like and including a pair of lips forming the valving end of said valve, and rigid means molded into said lips and adapted to be externally engaged by spring means for urging said lips together.

Other objects and advantages of the invention will be apparent to those skilled in the art.

Referring to the drawings, which are given by way of example, to illustrate the invention:

Fig. 1 is an elevation of one embodiment of the invention, in which a spring is externally applied to the valve for urging the lips thereof together;

Fig. 2 is a sectional elevation taken along the lines 2—2 of Fig. 1;

Fig. 3 is a plan view of the valve shown in Figs. 1 and 2;

Fig. 4 is a plan view similar to Fig. 3 showing the valve lips as they are formed in the mold, and before spring means is applied for urging said lips together;

Fig. 5 is an end view of a modification in which

2 a spring is actually molded into the rubber forming the lips of the valve, the free ends of said spring being urged apart by a plunger inside the mold;

Fig. 6 is a sectional elevation of a further modification in which rigid members are embedded in the lips of the valve; and Fig. 7 is an end view of the arrangement shown in Fig. 6 showing the application of C springs to the ends of the rigid members for urging the lips of the valve together.

Referring first to Figs. 1, 2, 3, and 4, my new and improved valve consists of a body 10 generally cylindrical in form and having a stepped hole 11 formed therein for engaging a correspondingly stepped bushing. Communicating with the stepped hole 11 is a tapered cavity 12 wherein the walls 13 and 14 converge toward each other and the walls 15 and 16 diverge.

Formed in the apex of the cavity 12 are lips 17 and 18 which are formed by a plunger (not shown) in the mold of oval or elliptical form. About the material forming the lips 17 and 18 is formed a groove 19 which, after the valve is molded, is engaged by spring means 20. The spring means preferably engages opposite straight portions 19a and 19b of the groove 19 so that the spring urges the lips 17 and 18 together along substantially parallel lines.

The straight sides of the body 10 terminate along curved lines 21 and 22 on the exterior surface thereof and these curved lines join the material in which the groove 19 is formed.

Due to the fact that the "set" of the rubber or the forming of the lips 17 and 19 is such that they would normally tend to remain open, the provision of the spring 20 urging said lips together along straight parallel lines 19a and 19b readily urges said lips together. It has been found that only sufficient resiliency to bring the lips into contact is necessary due to the fact that after the valve is closed, the head pressure (about the outside thereof) tends to maintain the lips in intimate contact. It has also been found that such valves may be used to handle many different kinds of fluid mediums very effectively. One example of my new and improved valve is in connection with the pumping of water containing extraneous matter, such as sand and gravel. It was found that where the valve closed on grains of sand or gravel, it did not leak, because the gravel or sand was embraced by the rubber or the like, instead of being held apart as would have been the case with the use of rigid check valves.

In the modification shown in Fig. 5, a spring 25 having free ends 26 and 27 is molded into the valve body parallel to the lips 17a and 18a. However, before the valve is molded and after the spring 25 is inserted, a plunger 28 in the mold is advanced to engage and separate the ends 26 and 27. This separation is maintained during the molding process, and after the valve is removed from the mold the free ends 26 and 27 of the spring may be cut off. Now, due to the fact that the ends of the spring were separated during the molding process, and due to the fact that the body of the spring is molded into the lips of the valve, the release of the free ends 26 and 27 allows the spring to urge the lips together.

Referring now to Figs. 6 and 7, a further modification is shown wherein a substantially rigid insert 30 is molded into the body in spaced relation to the lips 17, and a second insert 31 is molded into the body in spaced relation to the lips 18. The insert 30 is substantially rectangular in form and has lateral depressions 32 adjacent to one end thereof and 33 adjacent to the other end thereof. These lateral depressions are outside of the valve body and closely adjacent to the points where the insert extends therefrom. The insert 31 is similar and is provided with lateral depressions 34 and 35. When the valve body with its inserts is taken from the mold, a C spring 36 is caused to engage the lateral depressions 32 and 34, and a similar C spring 37 engages the lateral depressions 33 and 35. Thus, the C springs 36 and 37 conjointly urge the lips 17 and 18 together.

The embodiments herein shown and described relate more particularly to the molded valves per se, and it will be understood that they may be mounted on suitable supports and/or enclosed in suitable casings, as shown and described in the aforementioned Patent Number 2,417,968.

Although I have herein shown and described several embodiments in which valves are made by molding the bodies and the lips of rubber or the like, and have provided additional means for urging the lips together, it is obvious that many changes may be made in the arrangements herein set forth without departing from the scope of the invention as outlined in the following claims.

Having described my invention, what I claim is:

1. In a check valve, a molded tubular body formed of rubber or the like, open at one end and tapered near the other end, the tapered portion being slotted to form a pair of cooperative lips, grooves formed on opposite sides of the exterior of said tapered portion substantially parallel to said lips, the groove on one side being offset from the groove on the other side, and spring means lying in said grooves and embracing the tapered end for urging said lips together, the plane of the force exerted by said spring means being angular with respect to a plane at right angles to the plane of the slot between said lips.

2. In a check valve, a molded tubular body formed of rubber or the like, open at one end and tapered near the other end, the end surface of said tapered end being flat and lying in a plane at an angle of less than 90° with respect to the axis of said body, the tapered portion having a slot therein parallel to said axis and forming a pair of cooperative lips terminating at one end in said surface and communicating at the other end with the interior of the body, grooves formed on opposite sides of the exterior of said tapered portion substantially parallel to said lips, said grooves being substantially equidistant from said surface, and spring means including a loop extending laterally from said tapered end and having straight legs lying in said grooves for backing up said lips and urging them together in a direction along a plane substantially parallel to said surface.

3. In a check valve, a molded tubular body formed of rubber or the like, the interior bore of which is open at one end, the other end of said body being tapered and solid and terminating in a plane surface extending at an angle of less than 90° with respect to the axis of said bore, a slit extending axially into said body from said surface and lying substantially in a plane of said axis to form a pair of cooperative lips extending from said surface into said body and communicating with the interior bore, grooves formed on opposite sides of the exterior of said tapered portion substantially parallel to said lips, said grooves being substantially equidistant from said surface, and spring means including a loop extending laterally from said tapered end and having straight legs lying in said grooves for backing up said lips and urging them together in a direction along a plane substantially parallel to said surface.

LINDSAY H. BROWNE.

REFERENCES CITED

The following references are of record in the file of this patent:

UNITED STATES PATENTS

| Number | Name | Date |
| --- | --- | --- |
| 1,326,966 | Reeves | Jan. 6, 1920 |
| 1,809,259 | Williams | June 9, 1931 |
| 2,191,611 | Eshbaugh | Feb. 27, 1940 |
| 2,283,835 | Weaver | May 19, 1942 |

FOREIGN PATENTS

| Number | Country | Date |
| --- | --- | --- |
| 366 | Great Britain | Aug. 7, 1909 |
| 12,705 | Great Britain | May 31, 1913 |
| 15,392 | Great Britain | July 21, 1908 |
| 336,530 | Germany | May 4, 1921 |
| 591,502 | France | Apr. 10, 1925 |